July 25, 1961
G. A. LYON
2,993,735
WHEEL COVER
Filed Sept. 23, 1957
2 Sheets-Sheet 1
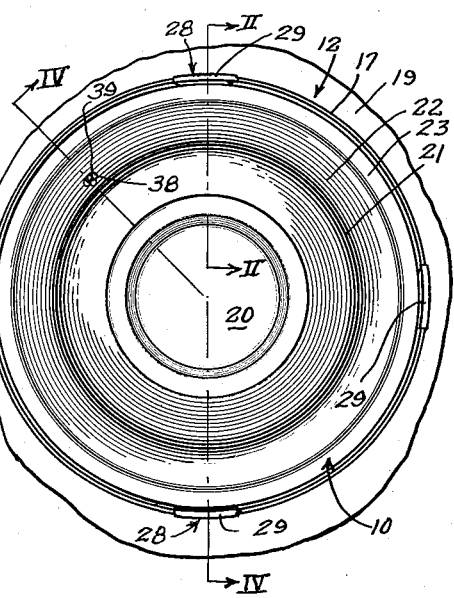
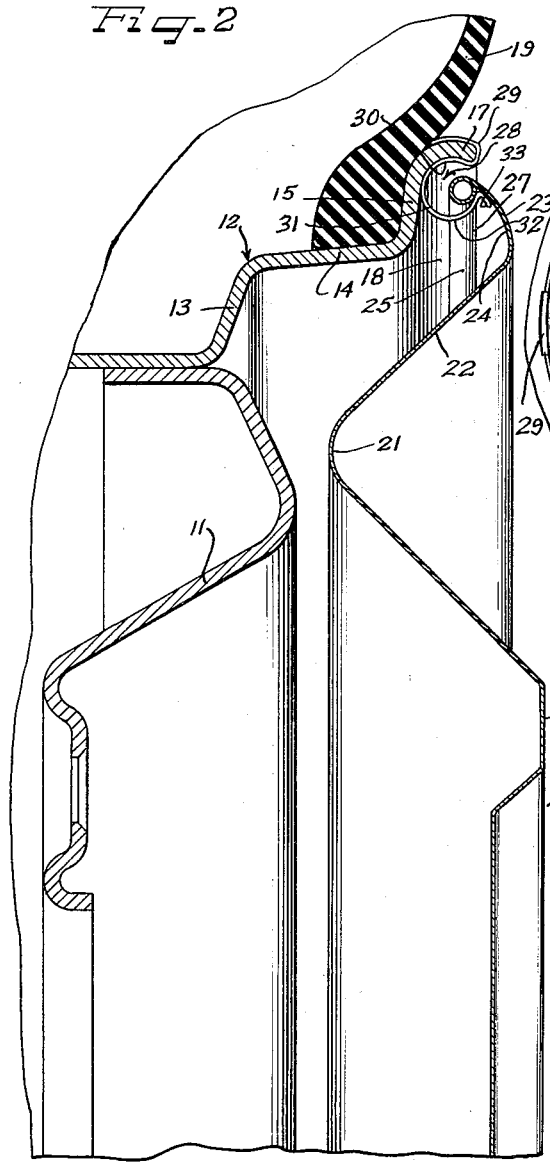
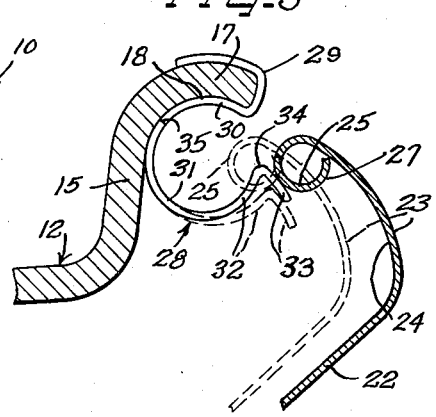
Inventor
GEORGE ALBERT LYON
by Hill, Sherman, Meroni, Gross & Simpson
Attys.

July 25, 1961  G. A. LYON  2,993,735
WHEEL COVER
Filed Sept. 23, 1957  2 Sheets-Sheet 2
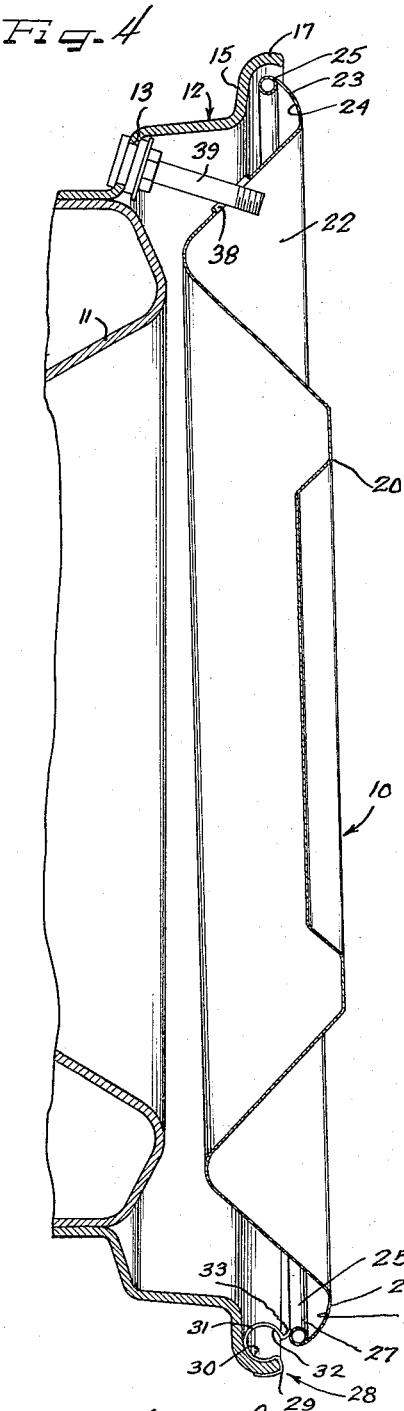
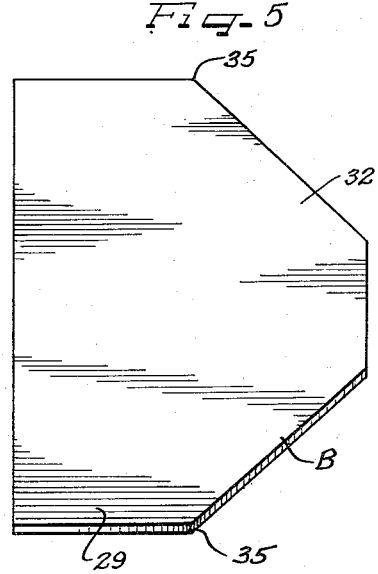
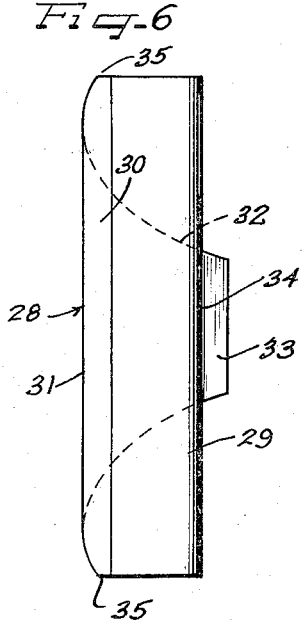
Inventor
GEORGE ALBERT LYON 2,993,735
Patented July 25, 1961

2,993,735
WHEEL COVER
George Albert Lyon, 13881 W. Chicago Blvd.,
Detroit 28, Mich.
Filed Sept. 23, 1957, Ser. No. 685,614
2 Claims. (Cl. 301—37)

The present invention relates to improvements in wheel structures and more particularly concerns the ornamental and protective covering of the outer sides of vehicle wheels.

An important object of the present invention is to provide novel wheel structure including improved means for retaining a wheel cover in covering relation to the outer side of a vehicle wheel.

Another object of the invention is to provide improved means for press-on, pry-off retention of wheel covers on the outer sides of vehicle wheels.

A further object of the invention is to provide an especially economical wheel cover and effective retaining means therefore.

Still another object of the invention is to provide novel cover retaining clip means for retaining a wheel cover in association with the terminal flange of a multi-flange drop center type of tire rim.

Yet another object of the invention is to provide an improved wheel cover assembly wherein a cover member is provided that is floatingly supported by the cover retaining clips.

Other objects, features and advantages of the present invention will be readily apparent from the following detailed description of a preferred embodiment thereof taken in conjunction with the accompanying drawings, in which:

FIGURE 1 is an outer side elevational view of a wheel structure embodying features of the invention;

FIGURE 2 is an enlarged fragmentary radial sectional view taken substantially on the line II—II of FIGURE 1;

FIGURE 3 is a further enlarged fragmentary sectional detail view of the terminal flange and clip portion of the wheel and showing how the cover is applied thereto;

FIGURE 4 is a transverse sectional detail view taken substantially on the angular section line IV—IV of FIGURE 1 and showing a mode of applying the cover to the outer side of the wheel;

FIGURE 5 is an isometric view of a sheet metal blank from which one of the spring clips of the present invention is adapted to be made; and FIGURE 6 is an outer side elevational view of the spring clip.

A wheel cover 10 according to the present invention is adapted to be applied in press-on, pry-off relation to the outer side of a vehicle wheel of the kind including a disk spider wheel body 11 carrying a multi-flange drop center tire rim 12 which includes an outer side flange 13, an intermediate flange 14 and a terminal flange that has a generally radially outwardly extending and axially outwardly facing inner portion 15 leading into an outer generally axially outwardly projecting turned or curved terminal flange extremity or lip portion 17 defining a generally radially inwardly facing or opening annular groove 18. A pneumatic tire of the tubeless type 19 is adapted to be supported by the tire rim.

The wheel cover 10 is of an especially economical type adapted to be made from suitable sheet material such as stainless steel, brass or aluminum sheet or strip stamped or drawn to shape. Centrally the wheel cover has a crown portion 20 adapted to overlie the wheel body 11 and leading into an intermediate annular dished portion 21 from which extends a generally radially and axially outward outer annular side portion 22 of the cover terminating in a turned generally annular rib reinforced marginal portion 23 defining at its inner side a generally axially inwardly opening annular groove 24 and provided with a substantially rigid underturned terminal bead 25 of substantial diameter and projecting generally axially inwardly and affording at its terminal portion a generally axially outwardly facing shoulder 27 at the radially outer side of the marginal groove 24 of the cover (FIGS. 2, 3 and 4). The diameter of the cover 10 is such that it is receivable in slightly spaced relation to the terminal flange lip portion 17 with the bead 25 telescoped therein and overlying the terminal flange portion 15.

Means are provided for retaining the cover in press-on, pry-off relation on the outer side of the wheel in completely floating supported relation and such means are especially adapted for optional application to the wheel. Furthermore, such means are of a nature to avoid any interference with full sealing interengagement of the opposing surfaces of the tire 19 and the tire rim 12 inasmuch as the tire rim provides with the tire an air chamber and it is essential that there be no leakage from such chamber. To this end, the cover retaining means comprise a suitable circumferentially spaced series of cover retaining spring clips 28 constructed and arranged to be mounted on the terminal flange of the tire rim. In the present instance, four of the retaining clips are shown as applied to the wheel (FIG. 1) although more or less of such clips may be utilized as preferred.

Each of the clips 28 is of a generally sinuous longitudinal section provided with a rim flange engaging loop portion 29 generally conformed to and engageable in clamping gripping relation with the curved terminal flange extremity or lip portion 17. A common intermediate leg portion 30 of the rim engaging clip loop 29 connects the same to a substantially larger and more resiliently flexible cover retaining spring loop 31 which is dimensioned to bottom in the assembly with the terminal flange portion 15 adjacent to the terminal flange extremity portion 17 and has a cover retaining generally axially and radially outwardly turned resilient leg 32 terminating in a generally reversely turned, divergent lead-in, cam flange cover supporting terminal 33 joined to the loop leg 32 by a rigid transverse angle bend generally radially outwardly projecting and generally axially inwardly facing juncture shoulder 34 constructed and arranged for retainingly engaging over the cover marginal bead shoulder 27 in the assembly.

In applying the retaining clip 28 to the tire rim, the loop portion 29 is worked over the rim lip 17 by pressing or hammering the loop portion into position from the tip of the rim flange and until the outer leg of the loop 29 has effected a full gripping engagement with the radially outer side of the rim flange portion 17 and the intermediate leg 30 of the clip has effected a full gripping clamping engagement within the groove 18 of the terminal flange. For this purpose, the intermediate clip leg 30 and the outer leg of the loop 29 are normally constructed to be spaced more closely than the thickness of the rim flange portion 17 so that there is a firm tensioned resilient gripping engagement of the clip loop 29 on the rim flange. In the mounted position of the clip 28, the resilient cover retaining loop 31 is in a curled relation to the terminal flange wherein the shoulder 34 of the clip projects to a slightly larger diameter than the diameter of the reentrant corner between the cover bead shoulder 27 and the generally axially inwardly facing shoulder provided by the opposing groove portion of the cover marginal turned portion 23 when centered on the wheel. Thereby, as best seen in FIGURE 3, the cover is adapted to be applied to the wheel by pressing the bead 25 cammingly against the lead-in cam surface of the clip terminal flange 33 for thereby deflecting the clip leg 32 from the normal position as shown in full outline to the dash outline position wherein the innermost surface of the bead 25 passes the shoulder projection 34 of the clip and snaps in behind the shoulder 34 into retaining engagement therewith. In this snap-on coaction, the clip shoulder 34 follows the curved surface of the bead 25 onto the bead shoulder 27 and until the shoulder 34 is received snugly in the reentrant corner between the bead shoulder 27 and the adjacent surface defining the cover groove 24. In this relationship, the clip terminal flange portion 33 engages as a stop and generally axially outwardly facing supporting shoulder against the opposing inside surface of the cover portion 23 for thereby supporting the cover in spaced relation to the wheel including the wheel body 11 and the tire rim 12 as best seen in FIGURE 2.

Not only is the retaining grip of the retaining clip 28 upon the rim flange 17 enhanced, but the resilient retaining flexibility of the clip loop 31 is improved and in addition any tendency of the retaining clip to work off of the rim flange 17 is precluded by construction of the intermediate clip leg 30 of increased retaining area and stiffness. This is economically effected as best visualized in FIGURES 5 and 6 by constructing the retaining clip 28 from a sheet metal blank B wherein the portion to comprise the rim-engaging loop 29 and the common leg 30 are of maximum width and with the portion to comprise the loop portion 32 of tapering shape to the tip thereof, and with such portions joined at the sides of the blank by angular corners 35. Shaping of the clip is effected by bending, generally about a pair of transverse axes parallel to the axis through the corners 35 to form up the respective clip loops 29 and 31. By preference, the width of the blank is greater than its length.

After the respective clip loops 29 and 31 have been formed, with the major width portion of the blank included in the loop 29 and the intermediate clip leg portion 30, the corners 35 provide side spurs that are engageable in substantial anchoring biting engagement with the opposing surface of the tire rim flange 17 within the groove 18. By the engagement of the spurs 35 and the wide clip leg 30 within the rim groove 18, substantial stability against twisting or canting distortions or displacement of the retaining clip is attained, despite substantial twisting or pulling or torsional forces thereon incident to application or removal of the cover or pressures against the cover in service.

In applying the cover 10 to the outer side of the wheel, a valve stem aperture 38 is registered with a valve stem 39 carried by the tire rim side flange 13, as shown in FIGURE 4. Such registration is generally effected by canting the margin of the cover wherein the valve stem 38 is provided in the cover portion 22 toward the valve stem. In so doing, the cover terminal bead 25 is engaged upon two of the retaining spring clips 28 which are preferably located in substantially equidistantly spaced relation at opposite sides or in flanking relation to the valve stem 39 as best seen in FIG. 1. Then, as the final assembly action upon the cover, the cover bead 25 at the opposite side of the cover from the valve stem aperture 28 is pressed axially inwardly toward the remaining cover retaining spring clips as indicated at the bottom of FIGURE 4. Thereby, the retaining bead 25 cams against the lead-in and supporting terminal flanges 33 of such remaining clips and in the continuing axially inward pressure upon the cover the clip legs 32 are resiliently radially inwardly deflected until the cover bead 25 snaps into retained shouldering relation to the retaining clips as previously described in connection with FIGURE 3. At the same time, retaining clip legs 32 of the initially engaged clips are placed under resilient tension so that the tension of all the clips about the perimeter of the cover is equalized. Thus the cover is supported in equalized floating substantially centered relation upon the wheel.

Axially inward pressures against the cover are taken up by the resiliency of the retaining clips and if the pressures are great enough, the retaining clip terminal supporting flanges 33 can slide at least to a limited extent along the generally axially outward and radially inward slope of the engaged portion of the cover margin 23 within the groove 24. Engagement of the clip loops 31 against the radially extending terminal flange portion 15, supports the loops 31 against being strained by excessive axially inward pressures. Transverse pressures against the cover are resiliently tensionably resisted but cushioned by the radial resilient deflectability of the clip legs 32. Limit upon flexing imposed upon the retaining clip legs 32 and thus avoidance of straining the clips is assured by abutting engagement of the radially outer perimeter of the cover bead 25 against the adjacent terminal flange lip 17 within which the bead is normally in gap relation. Such gap relation of the terminal bead of the cover to the tire rim is also desirable in enabling dirt or water to freely escape from behind the cover.

Removal of the cover from the outer side of the wheel is easily effected by inserting a pry-off tool such as a screwdriver (not shown) into the gap between the terminal bead 25 of the cover and the terminal flange 17 and exerting pry-off leverage to snap the cover bead from the respective clip or clips. Application of the pry-off force can be readily indexed visually by observing the location of one of the retaining clips 28. During the pry-off leverage, axially outward displacement of the clip loop or loops 31 to any appreciable extent is substantially precluded by the solid grip of the wide clip loop 29 on the rim flange 17 and the anchorage of the wide intermediate clip leg 30 within the rim groove 18 by virtue of the shouldering interengagement of the clip leg and the generally undercut shoulder provided at the axially outer side of the groove 18, substantially enhanced by the generally biting anchorage afforded by the spur points 35.

It will be understood that modifications and variations may be effected without departing from the scope of the novel concepts of the present invention.

I claim as my invention:

1. In a wheel structure including a tire rim having a terminal flange with generally radially extending and axially outwardly facing and generally axially extending and radially inwardly facing respective portions, a circumferentially spaced series of cover retaining clips each of which has a gripping loop portion engageable with the axially extending terminal flange portion and radially inwardly therefrom a resilient cover retaining loop portion opposingly engageable with the radially extending terminal flange portion and opening generally axially outwardly and having an outer terminal portion projecting generally radially inwardly and facing generally axially outwardly, with a portion of said cover retaining loop portion immediately adjacent juncture of said terminal portion therewith facing generally axially inwardly and radially outwardly and providing a cover retaining shoulder, a cover for disposition in press-on, pry-off relation with said cover retaining loop portions and having a terminal bead shoulder structure providing with the margin of the cover a reentrant corner defined at the axially outer side by a generally radially and axially inwardly facing shoulder, said cover bead being engageable within said cover retaining loop portions and with the juncture of said outer terminal portion engaging in said reentrant corner, said bead engaging said clip shoulders to retain the cover against axially outward displacement, and said outer terminal portions supportingly engaging said cover shoulder and providing the entire support for the cover and determining the axially inward disposition of the cover, the cover being thereby supported in equalized floating substantially centered relation upon the wheel, said cover retaining loop portions being engageable with said radially extending terminal flange portion to be backed up thereby and thus avoid straining of the cover retaining loop portions during axially inward pressure against the same by the cover.

2. In a wheel structure including a tire rim having a terminal flange with generally radially extending and axially outwardly facing and generally axially extending and radially inwardly facing respective portions, a circumferentially spaced series of cover retaining clips each of which has a gripping loop portion engageable with the axially extending terminal flange portion and radially inwardly therefrom a resilient cover retaining loop portion opposingly engageable with the radially extending terminal flange portion and opening generally axially outwardly and having an outer terminal portion projecting generally radially inwardly and facing generally axially outwardly, with a portion of said cover retaining loop portion immediately adjacent juncture of said terminal portion therewith facing generally axially inwardly and radially outwardly and providing a cover retaining shoulder, a cover for disposition in press-on, pry-off relation with said cover retaining loop portions and having a terminal bead shoulder structure providing with the margin of the cover a reentrant corner defined at the axially outer side by a generally radially and axially inwardly facing shoulder, said cover bead being engageable within said cover retaining loop portions and with the juncture of said outer terminal portion engaging in said reentrant corner, said bead engaging said clip shoulders to retain the cover against axially outward displacement, and said outer terminal portions supportingly engaging said cover shoulder and providing the entire support for the cover and determining the axially inward disposition of the cover, the cover being thereby supported in equalized floating substantially centered relation upon the wheel, said cover retaining loop portions being engageable with said radially extending terminal flange portion to be backed up thereby and thus avoid straining of the cover retaining loop portions during axially inward pressure against the same by the cover, said clips having a common leg between the gripping loop portion and the cover retaining loop portion thereof and said leg having circumferentially oppositely projecting spurs engaging in anchoring biting relation with the axially extending terminal flange portion to afford substantial stability for the clips against twisting or canting distortions or displacement incident to application or removal of the cover or pressure against the cover in service.

References Cited in the file of this patent

UNITED STATES PATENTS

| | | |
|---|---|---|
| 1,800,173 | Anderson | Apr. 7, 1931 |
| 2,137,416 | Rubsam | Nov. 22, 1938 |
| 2,281,153 | Horn | Apr. 28, 1942 |
| 2,351,655 | Aske | June 20, 1944 |
| 2,359,248 | Rubsam | Sept. 26, 1944 |
| 2,605,530 | Slemmons | Aug. 5, 1952 |
| 2,621,978 | Lyon | Dec. 16, 1952 |
| 2,749,184 | Wood | June 5, 1956 |
| 2,910,323 | Spisak | Oct. 27, 1959 |